3,012,932
COMPOSITIONS AND METHODS EMPLOYING INSECTICIDAL OIL SOLUBLE ORGANIC CARBYLAMINES
Jack F. Bussert, Calumet City, Ill., assignor to Standard Oil Company, Chicago, Ill., a corporation of Indiana
No Drawing. Filed Feb. 19, 1959, Ser. No. 794,235
12 Claims. (Cl. 167—22)

This invention relates to novel oil-soluble organic carbylamines. This invention further relates to insecticidal composition containing oil-soluble organic carbylamines and to destroying organisms, such as insects, in their larva, nymph, and adult stages.

It has been long established that hydrocarbon oils in themselves, although they possess insecticidal properties, are not efficient in commercial operations for destroying harmful insects. Hydrocarbon oils alone employed in sufficient amounts to be effective against insects in their varying stages of development are very costly and in fact in many cases harmful to plant life. Therefore, the insecticide art has developed a number of insecticidal additives to be employed in hydrocarbon oil carriers or other insecticide carriers. As results of the development in the field of insecticidal additives have come such insecticidal compositions as DDT, lindane, toxaphene, chlordane, etc. However, many such materials now in commercial usage are expensive to produce and therefore have economic drawbacks in their commercial application.

I have discovered certain new oil-soluble organic carbylamines which are useful as insecticides and which are derived from relatively inexpensive starting materials. Of particular use as insecticides are those oil-soluble carbylamines having the formula RN=C wherein R is an aliphatic, aralkyl or alicyclic organic hydrocarbon-containing radical having at least 12 carbon atoms and preferably from about 18 to about 24 carbon atoms or mixtures thereof. The aliphatic, aralkyl or alicyclic hydrocarbon radical may contain other substituents such as for example, alkoxy, cyano, hydroxy, halogen, nitro and other substituent groups. The oil soluble organic carbylamines of this invention may be used in insecticide carriers in amounts of from about .01 to about 20 weight percent as effective insecticides and preferably from about .025 to about 5.0 weight percent.

The oil-soluble organic carbylamines of this invention may be prepared by the action of chloroform on primary amines in the presence of alcoholic potassium hydroxide. The suitable primary amines which may be used to prepare the present compositions are those aliphatic, aralkyl, and alicyclic primary amines having at least 12 carbon atoms, for example, n-dodecylamine, n-tetradecyl amine, stearyl amine, n-octadecyl amine, n-hexadecenylamine, abietyl amines etc. Also suitable and more advantageous from a commercial standpoint are those aliphatic, aralkyl and alicyclic primary amines of a commercial quality which are produced as primary amines or mixtures of primary amines and marketed commercially. Examples of such commercial quality primary amines are 97% pure "Armeens" manufactured and sold by Armour & Company of Chicago, Illinois, under the trade names "Armeen 12," "Armeen 14D," "Armeen 16D" and "Armeen 18D." The above mentioned "Armeens" are mixtures of primary amines containing predominantly the number of carbon atoms specified in the code number. Other commercial primary amines which may be advantageously used are "Primene JMR," "Primene JMT," "Primene 81–R" and "Rosin Amine D." The "Primenes" are tertiary alkyl primary amines manufactured and marketed by Rohm and Haas Company, Philadelphia, Pennsylvania, and are composed of mixtures of various primary amines in a particular carbon atom range. "Primene 81–R," for example, contains tertiary alkyl primary amines having from 12 to 15 carbon atoms while the primary amines of "Primene JMT" and "Primene JMR" contain from 18 to 24 carbon atoms. "Rosin Amine D" is a mixture of abietyl amines manufactured and marketed by Hercules Powder Company and having approximately 60% dehydroabietyl amine, 30% dihydroabietyl amine and 10% tetrahydroabietyl amine.

Examples of the oil soluble organic carbylamines are those aliphatic, aralkyl and alicyclic carbylamines having at least 12 carbon atoms. More specific examples are n-dodecyl carbylamine, n-tetradecyl carbylamine, stearyl carbylamine, n-octadecyl carbylamine, n-hexadecyl carbylamine, abietyl carbylamine, etc. Also suitable and more advantageous because they may be derived from commercial primary amines are the $C_{12}$, $C_{14}$, $C_{16}$ and $C_{18}$ carbylamines derived from such commercial amines as the Armeens and constituting mixtures of carbylamines predominating in the specified number of carbon atoms of the Armeen code number. Also suitable are the mixed alkyl carbylamines having from 12 to 15 carbon atoms or from 18 to 24 carbon atoms such as may be prepared from the Primenes as identified above. The abietyl carbylamines may be, for example, dehydroabietyl carbylamine, dihydroabietyl carbylamine and tetrahydroabietyl carbylamine.

The insecticidal oil-soluble organic carbylamines may be used in amounts from about 0.01 to about 20 weight percent and preferably from about 0.025 to about 5.0 weight percent and an insecticidal carrier. The useful carriers are solvents, emulsifiable concentrates, and solid carriers. The solvent carriers which may be used are such fluids as acetone, petroleum distillates in the distillation range of furnace oils and kerosenes, and other normally liquid hydrocarbons. When used with a solvent carrier, the compositions are dissolved in the solvent and sprayed directly on the vegetation of the area where insect control is desired, such as by thermal fog generators. Amounts of the carbylamines used in solvent carriers are from about 0.01 to about 10 weight percent and preferably from about 0.025 to about 5.0 weight percent. Emulsifiable concentrates may be prepared by adding the oil soluble organic carbylamines to an oleaginous solvent, such as furnace oil or other hydrocarbons, in amounts of from about 10 to about 75 weight percent and preferably from about 25 to about 50 weight percent. At the time of application, the emulsifiable concentrate is mixed with from about 95 to 99.9 and preferably 99 to 99.8 weight percent of water sufficient to dilute the carbylamine content to from about .005 to about 10 weight percent and preferably from about .01 to about 4.0 weight percent and applied in the resulting emulsion. An emulsifying agent may advantageously be added. If it is desired to dust an area with the insecticide, the insecticide is impregnated on a solid carrier. The solid carrier is an inert solid carrier such as talc, pumice, silt, celites, chalk, wood flour, and clays such as fuller's earth, china clay, kaolin, celite or bentonite. The insecticidal carbylamines are impregnated on the solid carrier by preparing a concentrated solution of the carbylamine in a suitable volatile solvent such as acetone, mixing the dissolved carbylamine with the solid carrier and allowing the mixture to evaporate leaving the insecticidal composition in amounts of from about 1 to 20 and preferably 5 to 10 weight percent on the solid carrier. It is not necessary that the solid carrier be completely inert but it should be inert with respect to detrimental effects to plant life; thus the carrier may even be a pesticidal composition in itself or a solid fertilizing or nutrient composition.

The oil soluble organic carbylamines found useful as insecticides in the present invention are those hydrocarbon-containing carbylamines having at least 12 carbon atoms in the hydrocarbon chain and preferably from 18 to 24 carbon atoms. Of particular preference are those hydrocarbon carbylamines prepared from "Primene JMR," "Primene JMT," and "Rosin Amine D" as described above. The following are examples of the preparation of such carbylamines and are in no way intended to be limiting upon the scope of my claims.

EXAMPLE OF PREPARATION OF OIL SOLUBLE ORGANIC CARBYLAMINES

Example 1

60 g. (1.07 mole) of potassium hydroxide were dissolved in 150 ml. of dry ethanol in a 500 ml. flask and fitted with a mechanical stirrer. 103 g. (about 0.3 mole) of Primene JMR (molecular weight of from about 269 to 353 and boiling at from about 262 to 315° C.) were added to the flask and the resulting solution was cooled in an ice salt bath to about 0° C. while stirring. To the cooled and stirred solution, 45 g. (0.38 mole) of chloroform were added dropwise maintaining the temperature of the solution below 5° C. The solution was stirred for 2 hours at 5° C. and then allowed to come to room temperature. Stirring was continued over night at room temperature. The mixture was extracted with two 150 ml. portions of n-pentane. The pentane was evaporated with a stream of air and a yellow viscous corresponding alkylcarbylamine product weighing 101 g. was recovered.

Example 2

In a 500 ml. flask fitted with a mechanical stirrer, 56 g. (one mole) of potassium hydroxide was dissolved in 75 g. of dried ethanol. 91 g. (about 0.3 mole) of Rosin Amine D were added to the potassium hydroxide ethanol solution. The resulting mixture was cooled in an ice salt bath to 0° C. while stirring. To the cooled and stirred solution, 20 g. (0.167 mole) of chloroform were added dropwise keeping the temperature below 5° C. The cooled solution was stirred for 2 hours at 5° C. and the temperature was then raised to room temperature. Stirring was continued at room temperature over night. The mixture was then extracted with two 150 ml. portions of n-pentane. The pentane was evaporated by means of an air stream and a yellow viscous hydroabietylcarbylamine product weighing 104 g. was recovered.

Example 3

60 g. (1.07 mole) of potassium hydroxide was dissolved in 150 ml. of dry ethanol in a 500 ml. flask fitted with a mechanical stirrer. To the resulting solution, 103 g. (about 0.30 moles) of Primene JMT (having a molecular weight of about 269 to 353 and a boiling range of 51 to 70% at 262° to 315° C.) were added. The solution was cooled in an ice salt bath to 0° C. with stirring. 45 g. (0.38 mole) of chloroform were added dropwise to the cooled and stirred solution, maintaining the temperature below 5° C. The solution was stirred for 2 hours at 5° C. and allowed to come ot room temperature. The solution was maintained at room temperature over night with stirring. The mixture was then extracted with two 150 ml. portions of n-pentane. Evaporation of the pentane with a stream of air gave a 115 g. yield of the yellow viscous corresponding alkylcarbylamine product.

EXAMPLES OF BIOLOGICAL ACTIVITY

To test the biological activity of the oil-soluble organic carbylamines as prepared in the above examples the following samples of insecticidal compositions were prepared and subjected to the biological activity test as indicated below:

Sample A—Acetone 0.5% by weight of Example 1.
Sample B—Acetone containing 0.2 weight percent of the product of Example 1.
Sample C—Acetone containing 0.05 weight percent of the product of Example 1.
Sample D—Acetone containing 0.025 weight percent of the product of Example 1.
Sample E—Acetone containing 0.5 weight percent of the product of Example 2.
Sample F—Acetone containing 0.2 weight percent of the product of Example 2.
Sample G—Acetone containing 0.050 weight percent of the product of Example 2.
Sample H—Acetone containing 0.025 weight percent of the product of Example 2.
Sample J—Acetone containing 5.0 weight percent of the product of Example 3.
Sample K—An emulsion of 0.6 weight percent of an aromatic solvent [1] and 99.2 weight percent of water-containing 0.2 weight percent of the product of Example 2 prepared by forming an emulsifiable concentrate of Example 2 in the oil and emulsifying the concentrate with water.
Sample L—An emulsion of 0.3 weight percent of an aromatic solvent [1] and 99.6 weight percent of water-containing 0.1 weight percent of the product of Example 2 prepared by forming an emulsifiable concentrate of Example 2 in the oil and emulsifying the concentrate with water.
Sample M—An emulsion of 0.15 weight percent of an aromatic solvent [1] and 99.8 weight percent of water-containing 0.05 weight percent of the product of Example 2 prepared by forming an emulsifiable concentrate of Example 2 in the oil and emulsifying the concentrate with water.

*Mexican bean beetle tests.*—Five Mexican bean beetles in the second to fourth instar larval stage were subjected to the action of the composition of samples A and E by contact spray or stomach poison as indicated in Table 1. In the contact spray test, the Mexican bean beetles were subjected to a Pete-Grady gun spray of one cc. of the sample to be tested at 10 p.s.i.g. in an enclosure. In the stomach poison tests two ccs. of the sample to be tested were applied to feed (excised bean leaves in an enclosure with the Mexican bean beetles). At the end of 72 hours, for each test the numbers dead and alive Mexican bean beetles were counted. Each test was repeated for each sample tested and the total number dead was used to compute the percent dead reported in Table 1 as an indication of biological activity.

TABLE 1.—BIOLOGICAL ACTIVITY AGAINST MEXICAN BEAN BEETLES

| Sample | How Tested | Biological Activity (percent dead) |
| --- | --- | --- |
| A | Contact Spray | 100 |
| B | Stomach Poison | 90 |

*Two-spotted spider mite test.*—A variable number of two spotted spider in the nymph and adult stage on infested bean leaves were subjected to the action of the poisons of samples B, C, D, F, G, H, K, L and M by contact spray with a Pete-Grady gun at 5 p.s.i.g. air line pressure. The infested bean leaves were placed in an enclosure during and after contact and were sprayed during and after contact and were sprayed to wetting with the sample to be tested. At the end of 24 hours for each test the number dead and alive two spotted spider mites were counted. The total number of dead with respect to the total number of two spotted spider mites subjected to the test was used to compute the per-

[1] Alkylated benzenes having an initial boiling point of 290 to 305° F.; an end point of 390 to 410° F.; a kauri-butanol value not less than 90; and a flash point (Tag closed cup) not less than 90° F.

cent dead reported dead in Table 2 as an indication of biological activity.

TABLE 2.—BIOLOGICAL ACTIVITY AGAINST TWO SPOTTED SPIDER MITES

| Sample: | Biological activity (percent dead) |
|---|---|
| B | 100 |
| C | 94 |
| D | 95 |
| F | 100 |
| G | 100 |
| H | 99 |
| K | 100 |
| L | 100 |
| M | 99 |

*Oriental roach test.*—Ten Oriental roaches were placed in an enclosure and subjected to the action of 0.5 cc. of sample J by contact spray with a Pete-Grady gun operating under 10 p.s.i.g. air line pressure. After spraying, the Oriental roaches were kept in the enclosure for 72 hours at the end of which period the numbers of roaches dead and alive were counted. The test was repeated and from calculations based on the total number dead and total number alive from both tests it was determined that the 0.5 cc. of sample J killed 95% of the roaches in the enclosure.

Besides the above composition, I have tested butyl carbylamine, octyl carbylamine and a mixture of t-alkyl carbylamines having from 12 to 15 carbon atoms in the t-alkyl group. The butyl carbylamines and octylcarbylamines are completely unsuitable as insecticides. The alkyl carbylamines having from 12 to 15 carbon atoms in the alkyl group exhibited good biological activity against insects, but were not of the excellent biological activity exhibited by the oil soluble organic carbylamines having the formula RN=C wherein R is a hydrocarbon radical having from 18 to 24 carbon atoms as are exemplified by the above examples and samples.

PHYTOTOXICITY

After the running of samples D, F, G and H in the Mexican bean beetle test, above, the excised bean leaves were examined for injury by phytotoxic action of the respective samples. No sign of any toxicity was observed.

"Insecticidal composition" as used herein refers generally to a composition for use against beetles, aphids, flies, mites, ticks, roaches, etc. whether or not they be true insects under more technical interpretation.

The oil soluble organic carbylamines of this invention and the insecticidal composition containing the same have been described by reference to specific embodiments thereof, given by way of illustration only. Modifications and variations thereof will be apparent to those skilled in the art from my description.

I claim:

1. An insecticidal composition containing an insecticide carrier and an amount in the range of from about 0.01 to about 75 weight percent of an oil soluble organic carbylamine having the formula RN=C wherein R is an organic hydrocarbon radical having from about 12 to 24 carbon atoms and selected from the class consisting of abietyl and alkyl radicals.

2. The insecticidal composition of claim 1 wherein said amount is from about 0.01 to about 20 weight percent.

3. The insecticidal composition of claim 2 wherein R contains from about 18 to about 24 carbon atoms.

4. The insecticidal composition of claim 2 wherein R is a dehydroabietyl radical.

5. The insecticidal composition of claim 2 wherein R is a tertiary alkyl radical having from 18 to 24 carbon atoms.

6. An insecticidal composition containing a solvent carrier and from about 0.01 to about 10.0 weight percent of an oil soluble organic carbylamine having the formula RN=C wherein R is an organic hydrocarbon radical having at least about 12 carbon atoms and selected from the class consisting of abietyl and alkyl hydrocarbon radicals.

7. An insecticidal composition containing a powder carrier and from about 1 to about 20 weight percent of an oil soluble organic carbylamine having the formula RN=C wherein R is an organic hydrocarbon radical having at least about 12 carbon atoms and selected from the class consisting of abietyl and alkyl hydrocarbon radicals.

8. An insecticidal composition emulsion concentrate containing a solvent carrier and from about 10 to about 75 weight percent of an oil soluble organic carbylamine having the formula RN=C wherein R is an organic hydrocarbon radical having at least about 12 carbon atoms and selected from the class consisting of abietyl and alkyl hydrocarbon radicals.

9. An insecticidal composition comprising an emulsion of from about 0.1 to about 5.0 weight percent of the composition of claim 13 emulsified with from about 95.0 to about 99.9 weight percent of water.

10. An insecticidal composition containing a fluid insecticide carrier and from about .01 to about 20 weight percent of an oil soluble carbylamine having the formula RN=C wherein R represents a hydrocarbon alkyl radical having from about 18 to about 24 carbon atoms.

11. A process of killing insects which process includes the use of an insecticide composition containing an insecticide carrier and from about .01 to about 20 weight percent of an oil soluble organic carbylamine having the formula RN=C wherein R represents an organic hydrocarbon radical having at least about 12 carbon atoms and selected from the class consisting of abietyl and alkyl hydrocarbon radicals, and which process comprises contacting said insects with said insecticide composition.

12. The method of killing insects, which method comprises contacting insects with a composition containing an insecticide carrier and from about .01 to about 20 weight percent of an oil soluble organic carbylamine having the formula RN=C wherein R represents an organic hydrocarbon radical having at least about 12 carbon atoms and selected from the class consisting of abietyl and alkyl hydrocarbon radicals.

References Cited in the file of this patent

UNITED STATES PATENTS

| 2,033,536 | Ralston | Mar. 10, 1936 |
| 2,356,075 | Migrdichian | Aug. 15, 1944 |
| 2,416,004 | Hall | Feb. 18, 1947 |

OTHER REFERENCES

Chemical Abstracts 39, 5930 (1945).